No. 860,624. PATENTED JULY 23, 1907.
W. P. BARTEL.
METHOD FOR FORMING RIVETS.
APPLICATION FILED JAN. 5, 1907.
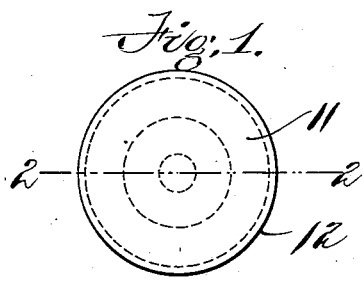
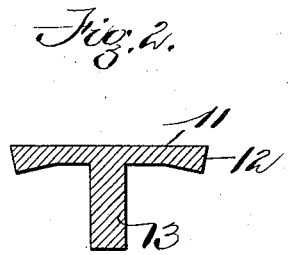
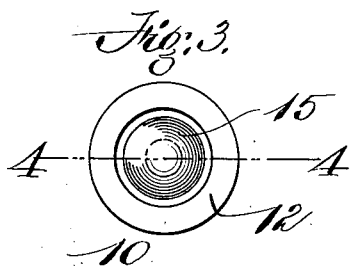
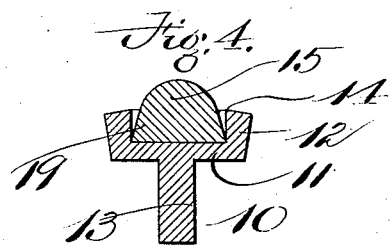
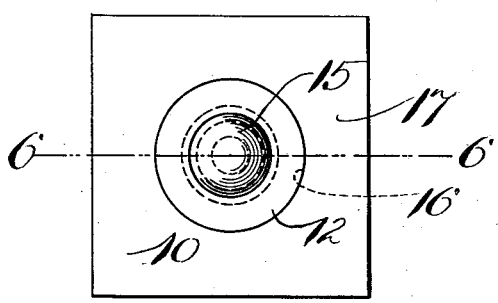
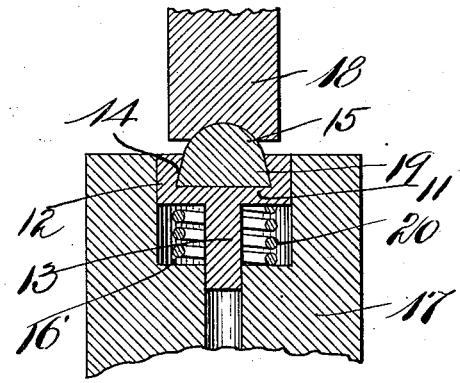
Witnesses:
Ernest A. Telfer
Walter L. Pierce
Inventor:
William P. Bartel
by his attorney
Charles S. Gooding

UNITED STATES PATENT OFFICE.

WILLIAM P. BARTEL, OF WALTHAM, MASSACHUSETTS, ASSIGNOR TO JUDSON L. THOMSON M'F'G COMPANY, A CORPORATION OF MAINE.

METHOD FOR FORMING RIVETS.

No. 860,624.  Specification of Letters Patent.  Patented July 23, 1907.

Application filed January 5, 1907. Serial No. 350,874.

*To all whom it may concern:*

Be it known that I, WILLIAM P. BARTEL, a citizen of the United States, residing at Waltham, in the county of Middlesex and State of Massachusetts, have invented new and useful Improvements in Methods for Forming Rivets, of which the following is a specification.

This invention relates to an improved method of manufacturing two-part rivets, the completed rivet consisting of a shank having a flange with a recess in its upper face and with the outer periphery of said flange substantially cylindrical in form, said recess being frusto-conical in shape and inclosing therein a head preferably formed of hardened metal and having a frusto-conical base which fits in said recess, whereby the two parts of the rivet are locked one to the other so that they cannot be separated in the practical use for which said rivet is designed to be used.

The invention consists in the method of forming two part rivets hereinafter described and particularly pointed out in the claims.

Referring to the drawings: Figure 1 is a plan view of a portion of the rivet designed to be formed by my improved method. Fig. 2 is a section taken on line 2—2, Fig. 1. Fig. 3 is a plan view of the two parts of the rivet with the shank partially formed and the head inclosed in the recess formed in the upper face of said shank. Fig. 4 is a section taken on line 4—4, Fig. 3. Fig. 5 is a plan view of the completed rivet and the female die by which the last process in the operation of forming the rivet is obtained. Fig. 6 is a section taken on line 6—6, Fig. 5, showing both male and female dies, said dies being broken away.

Like numerals refer to like parts throughout the several views of the drawings.

In the drawings, 10 is the shank of the rivet, 11 the flange, 12 the rim, 13 the stem, 14 the recess in the upper face of the shank, and 15 the head formed preferably of hardened metal. In Figs. 1 and 2, the shank is illustrated as formed by suitable dies in their first forming operation, the same being a flat headed rivet consisting of a stem 13 and a flange 11, the rim 12 of said flange decreasing in thickness from the outer periphery of the flange toward the stem 13.

The second step in the method of forming the shank and rivet consists in forming the shank illustrated in Fig. 2 into the form illustrated in Fig. 4, that is, the rim 12 of the shank 11 is forced into a suitable female die by a suitable male die in such a manner as to bend the rim 12 upwardly as shown in Fig. 4, the periphery of said rim being left by this operation in frusto-conical form, said annular rim surrounding a recess 14 preferably cylindrical. The head 15 is then placed in the recess 14 and the head and shank forced downwardly into a cylindrical recess 16 in the female die 17, the same being driven into said female die by the male die 18, Fig. 6. This last operation crowds the rim 12 inwardly until the recess 14 becomes a frusto-conical recess and the periphery of the flange 11 becomes a cylinder so that the head 15 which is formed preferably with a frusto-conical base 19 is locked to the flange 11. As the male die 18 is withdrawn the completed rivet is forced out of the female die by a suitably arranged spring 20.

While it is preferable in a completed rivet that the periphery of the same should be of cylindrical form, it is evident that the same might be of conical form without departing from the spirit of my invention so long as the periphery of the flange 11 in the completed rivet more closely approaches a cylinder than the periphery of the flange prior to being forced into the final forming die, as illustrated in Fig. 4. It is also evident that the shape of the base of the head and the recess in the upper face of the flange might be varied without departing from the spirit of my invention so long as in the resulting structure the rim of the flange interlocks with the base of the head. For instance, the base of the head might have a projection thereon which would project into a recess in the rim of the flange and this recess in the rim of the flange might be formed in the upper face of the flat headed rivet illustrated in Fig. 2 during the same operation as that in which said flange is formed upon the stem 13 without departing from the spirit of my invention. It is moreover obvious that the flange 11 might be formed (as in Fig. 4) by drilling or boring a recess 14 in the upper face of the flange and then forming said flange by means of the male and female dies as illustrated in Fig. 6 so that the frusto-conical periphery of the flange would be changed to a cylindrical periphery without departing from the spirit of my invention.

The gist of the invention resides in forming the shank with a flange having a recess in its upper face adapted to receive the head of the rivet, said flange having a frusto-conical periphery and subsequently forcing said flange against said head by changing the shape of the recess in which said head is located and thus locking the parts together at the same time changing the form of the periphery of the flange from a frusto-conical formation to a cylindrical formation or from a frusto-conical formation to a form more nearly approaching that of a cylinder.

Having thus described my invention, what I claim and desire by Letters Patent to secure is:

The herein described method of manufacturing two part rivets, consisting in first, forming a blank consisting of a shank and a flange integral therewith, said flange increasing in thickness toward the periphery thereof; second, turning the periphery of said flange upwardly to form a cup, the diameter at the mouth of the opening of said cup being at least as great as at the base of said cup; third, placing a head piece in said opening; and fourth, die-drawing said cupped flange to force the walls thereof inward against said head piece.

In testimony whereof I have hereunto set my hand in presence of two subscribing witnesses.

WILLIAM P. BARTEL.

Witnesses:
　CHARLES S. GOODING,
　ANNIE J. DAILEY.